United States Patent Office 3,624,857
Patented Dec. 7, 1971

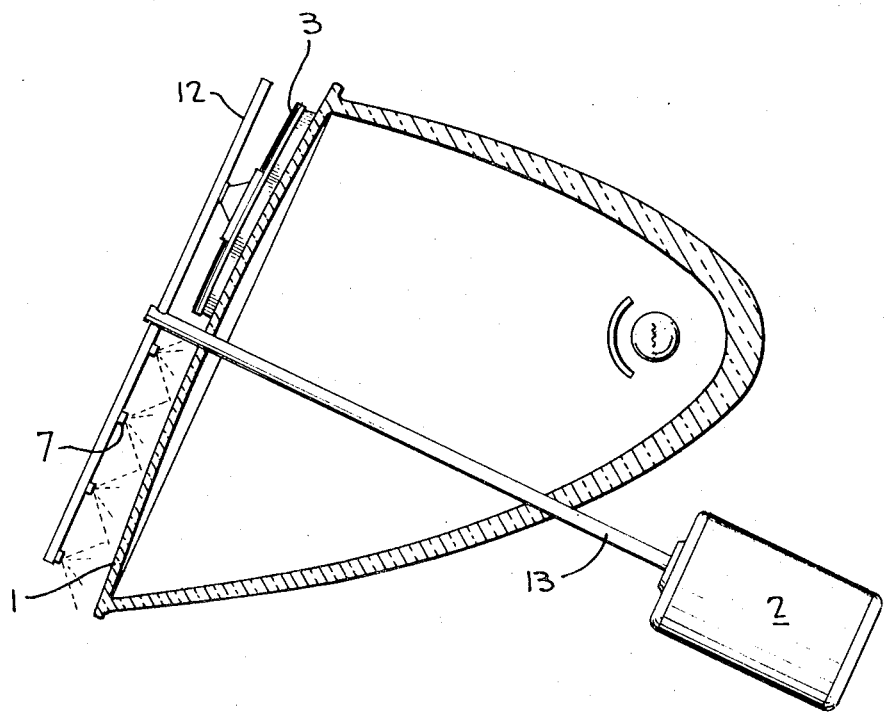

3,624,857
HEADLIGHT CLEANERS FOR VEHICLES
Walter Holzer, Meersburg, Germany, assignor to
Holzer Patent AG, Zug, Switzerland
Filed Feb. 9, 1970, Ser. No. 9,719
Claims priority, application Germany, Feb. 14, 1969,
P 19 07 601.8
Int. Cl. B60s 1/48
U.S. Cl. 15—250.04           5 Claims

ABSTRACT OF THE DISCLOSURE

Apparatus for wiping the inclined cover plate of a parabolic headlight enclosure is mounted to a rotatable shaft, which extends perpendicularly through the cover plate and through the headlight enclosure and is also inclined to the light optical axis so that interference of the shaft with the light projected from a light source mounted at the geometrical focus of the headlight enclosure is reduced.

---

The invention relates to a device mounted on and in a headlight to clean the front cover plate thereof, particularly for use in connection with motor vehicle headlights.

The cover plates of headlights of motor vehicles in time become covered or coated with foreign material such as dirt and this is particularly troublesome in connection with vehicle headlights and may become the source of accidents. In driving power vehicles in particularly bad weather such as fog and rain, it is very often possible that due to the weather conditions, driving of the vehicle becomes somewhat difficult not only for the vehicle itself but also oncoming vehicles. In view of heavy traffic today, it is not practical or possible to stop a vehicle so that the headlights can be cleaned. In order to clean headlights at any time during the time that the vehicle is in motion, it was considered possible to provide a washing arrangement in which a wiping blade in the form of a window wiper can be moved back and forth on the windshield. This known structure is however applicable only when it is desired that the wiping blades are to be guided in a particular manner and they are therefore rather expensive to apply and can actually be used only in a practical sense for vehicles which are expensive.

It is therefore an object of the present invention to provide a device in which by simple means, it is possible to clean the cover plates of headlights and for this purpose the object of the invention is achieved by the use of at least one outer flat wiper which is provided with a shaft driven by a motor and which has a mounting which will not obscure the optical view through the plate of a headlight.

A particular further object of the invention resides therein, that the cleaning and washing device can be easily constructed and by constant rotation of a washing arm, a relatively simple structure can be provided. A simple construction of the wiping device enables the length of the wiping arm to be approximately equal to the radius of the covering disk or plate. A further structure of the device can comprise a form of the wiper so that the length of the wiper arms are approximately the same as the diameter of the covering plate. In order to affect a higher cleaning function it is possible to provide the wiping arms with nozzles to force a cleaning fluid on the surface to be cleaned. In a further modification of the invention, it is possible to provide the wiping blade in a divided structure or provide a plurality of blades. The wiping arm according to the invention can be so constructed that half thereof can be provided with at least a wiping pad and another half thereof can be provided with nozzles for the purpose of directing cleaning fluid or water on the surface to be cleaned. For the latter purpose, the invention contemplates the structure in which the shaft from the motor is a hollow shaft into and through which a cleaning fluid or water can be passed.

A further object of the invention resides in the structure of the motor which can be provided with a pump device for directing and providing cleaning fluid under pressure if necessary. In order to maintain the wiping arm in a definite position in which the device is not operating, the invention contemplates the provision of an automatic breaker contact in order to stop the motor in a definite position relative to the wiper arm.

Further objects will be apparent from the following description when considered in connection with the accompanying drawing which is a cross-section of a headlight with the cleaning device mounted thereon.

The headlight is provided with a covering disk 1 usually composed of glass and in accordance with this invention, it is the object to clean the glass cover from time-to-time. For this purpose, there is provided a wiping arm 12 which is provided with one or more wiping blades 3 and wiping arm 12 is rotatably mounted to the headlight. The wiping blade 3 is pressed against the outer side of the cover plate 1 and wiping arm 12 is secured on a shaft 13 connected to a motor 2. The wiping blade or pad 3 is mounted on the wiping arm 12 and thus wiping pad 3 describes a rotating motion on the cover plate or disk 1 and in this way, it tends to wipe any foreign matter off of the plate 1. It is also possible to provide the wiping arm 12 with one or more nozzles so that a cleaning fluid such as, for example water, can be applied. The arm 12 is provided with one or more openings or nozzles 7 in order to apply and direct a washing liquid as water on the cover plate 1. As shown on the drawing, the wiping blade 3 is mounted on one-half of the length of the wiping arm 12 and the other half is provided with one or more nozzle openings 7 from the latter, of which a cleaning fluid such as water may be forced therefrom.

If desired, the cleaning fluid to the arm 12 can be directed through the shaft 13 of the motor and for this purpose, the shaft 13 can be made hollow. The motor 2 can also be provided with a pump to force the cleaning fluid through the shaft 13 and to the wiping arm 12.

For optical reasons one can make sure that the wiping arm 12 in its non-operative position, shall assume always a definite position and this can be accomplished by providing the motor 2 with an automatic breaker switch so that the wiping arm 12 will always assume the same position in its non-operative setting.

In the structure according to the invention, a parabolic headlight having a light source mounted at the geometrical focus thereof is utilized so that it will project light rays in a horizontal direction and for this purpose the cover plate 1 need not be provided in a vertical plane but in a plane which is at an angle to the vertical. This structure of the headlight, as to the cleaning and washing device, enables the rotation of the wiping arms 12 to be provided, if desired, with a linkage connected to the shaft 13. Thus it is possible to utilize a structure in which there is provided a rigid shaft extending perpendicularly to the cover plate through the center thereof and it is of course obvious that the position of the latter can assume any desired angle which might be necessary or advisable for the position of the covering disk for the headlight so as to reduce interference with the amount of light projecting from the light source through the cover plate. By means of various mechanical elements, as for example, a cardan linkage or a spring coupling can be used and furthermore the headlight plate 1 can be positioned so that it is absolutely vertical.

I claim:
1. An automobile headlight assembly comprising:
a parabolic headlight enclosure;
a light source mounted within said headlight enclosure at the geometrical focus thereof;
said headlight enclosure including a cover plate mounted inclined to the light optical axis of said light source;
a rotatable shaft extending through said headlight enclosure and perpendicularly through said cover plate at the center thereof, and inclined to said light optical axis whereby said shaft intersects said optical light axis so as to reduce interference with light projected from said light source;
means for rotating said shaft;
a wiper arm mounted to said shaft external to said cover plate; and
means mounted to said wiper arm for cleaning said cover plate upon rotation of said shaft.

2. A device according to claim 1 wherein said means mounted to said wiper arm includes a plurality of nozzles to direct fluid onto said cover plate.

3. A device according to claim 2, wherein said means mounted to said wiper arm further includes a wiper pad contacting said cover plate.

4. A device according to claim 3, wherein said wiper arm extends diametrically across said cover plate, said wiper pad extends at least across a half portion thereof and said plurality of nozzles extends across the remaining half of said wiper arm.

5. A device according to claim 1, wherein said shaft is hollow to direct a fluid therethrough to said plurality of nozzles.

References Cited

UNITED STATES PATENTS 3,493,804    2/1970    Fennell _____ 15—250.22 X

PETER FELDMAN, Primary Examiner

U.S. Cl. X.R.

15—250.22; 313—110